(12) United States Patent
Fuse et al.

(10) Patent No.: US 7,857,338 B2
(45) Date of Patent: *Dec. 28, 2010

(54) STEERING DAMPER MOUNTING STRUCTURE FOR A VEHICLE

(75) Inventors: Tomohiro Fuse, Saitama (JP); Mikio Uchiyama, Saitama (JP); Yotaro Mori, Saitama (JP); Hiroki Yoshihi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 11/892,756

(22) Filed: Aug. 27, 2007

(65) Prior Publication Data

US 2008/0054591 A1  Mar. 6, 2008

(30) Foreign Application Priority Data

Aug. 30, 2006  (JP) .............................. 2006-234068

(51) Int. Cl.
 *B62K 21/08* (2006.01)
(52) U.S. Cl. .......................... 280/272; 280/271; 280/90
(58) Field of Classification Search ................. 280/272, 280/271, 89, 90, 89.12, 89.13, 276; 362/475, 362/476
See application file for complete search history.

(56) References Cited

U.S. PATENT DOCUMENTS

| 2003/0146594 A1* | 8/2003 | Bunya et al. ................. 280/272 |
| 2004/0145897 A1* | 7/2004 | Felty ........................... 362/473 |
| 2004/0257821 A1* | 12/2004 | Toyofuku .................... 362/475 |
| 2005/0046141 A1* | 3/2005 | Gogo et al. ................. 280/271 |
| 2008/0054590 A1* | 3/2008 | Mori et al. .................... 280/272 |

FOREIGN PATENT DOCUMENTS

| DE | 27 10 651 A1 | 6/1978 |
| EP | 1 491 436 A2 | 12/2004 |
| JP | 2003-104270 A | 4/2003 |
| JP | 2005-96735 A | 4/2005 |
| JP | 2006-123888 A | 5/2006 |

* cited by examiner

*Primary Examiner*—Anne Marie M Boehler
(74) *Attorney, Agent, or Firm*—Birch, Stewart, Kolasch & Birch, LLP

(57) ABSTRACT

A steering damper ensures a wide longitudinal illumination range of a road surface when a light unit is provided and facilitates layout of parts and simplifies structure without degrading appearance. A steering damper mounting structure is provided for a vehicle, which includes a head pipe, a front fork, a fork bridge, and a steering damper. The steering damper is mounted on the fork bridge and the head pipe. The steering damper dampens a movement transmitted from a side of the front wheel to a handlebar. In this steering damper mounting structure, the steering damper is mounted to the head pipe and the top bridge and disposed on the side of the top bridge between the top bridge and the bottom bridge. Additionally, a light unit is disposed on the side of the bottom bridge between the top bridge and the bottom bridge.

20 Claims, 10 Drawing Sheets

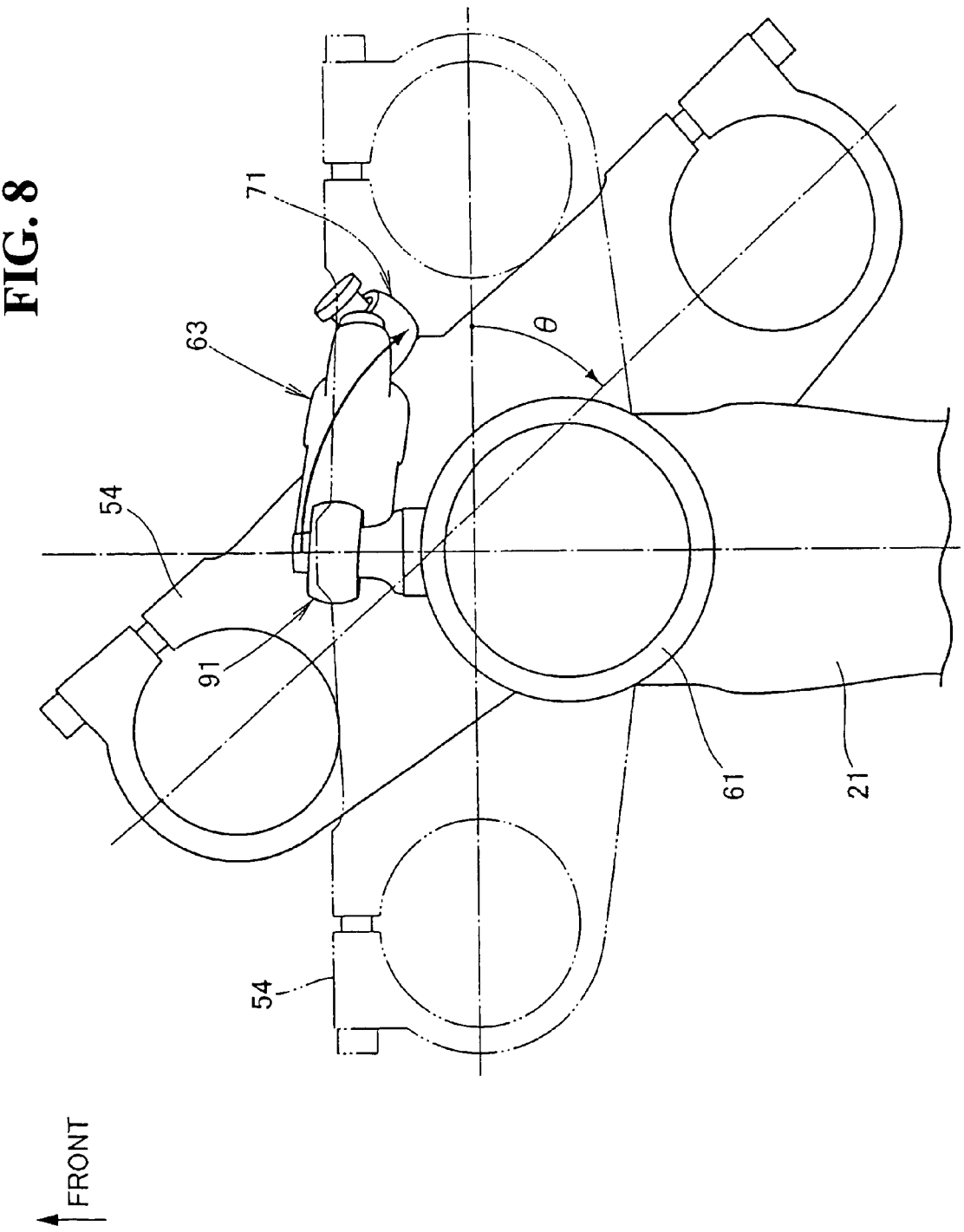

FIG. 9(a)
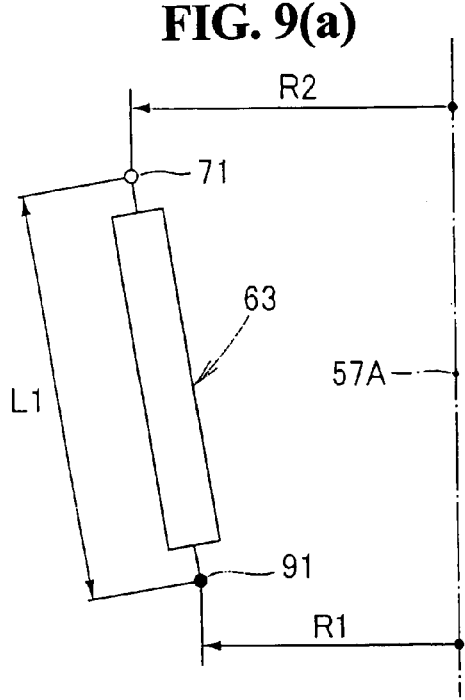
Embodiment
FIG. 9(c)
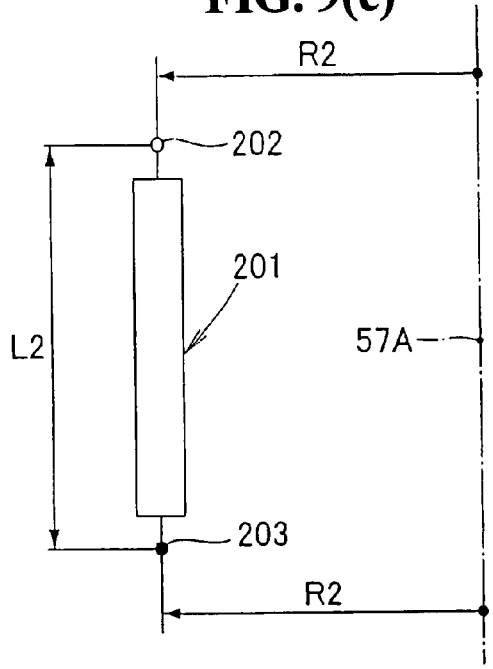
Comparative Embodiment
FIG. 9(b)
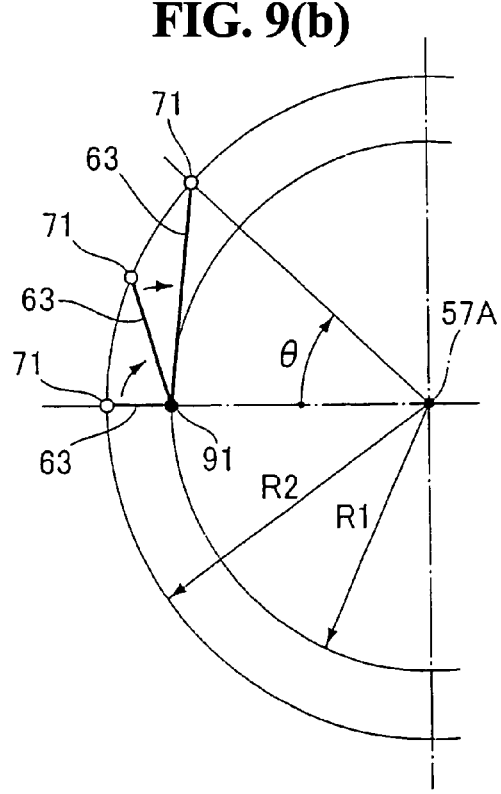
Embodiment
FIG. (d)
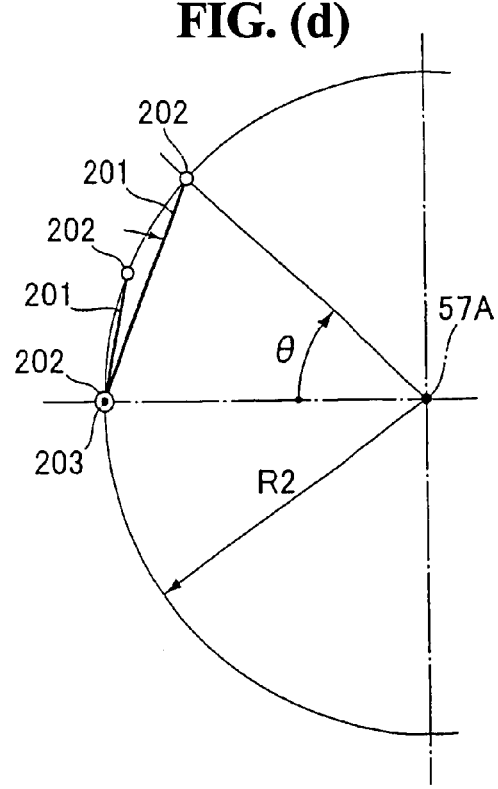
Comparative Embodiment

STEERING DAMPER MOUNTING STRUCTURE FOR A VEHICLE

CROSS-REFERENCE TO RELATED APPLICATIONS

This nonprovisional application claims priority under 35 U.S.C. §119(a) on Patent Application No. 2006-234068, filed in Japan on Aug. 30, 2006, the entirety of which is incorporated herein by reference.

BACKGROUND OF THE INVENTION

1. Field of the Invention

The present invention relates to a vehicular steering damper mounting structure that dampens a steering directional movement transmitted from a road surface to a handlebar via a front wheel and a front fork.

2. Background of the Invention

A known vehicular steering damper mounting structure includes a tubular damper, as a steering damper, disposed between a head pipe on a side of a vehicle body frame and a bottom bridge on a side of a front fork (see, for example, Japanese Patent Laid-open No. 2005-96735). The arrangement disclosed in FIGS. 1 and 2 of Japanese Patent Laid-open No. 2005-96735 will be described below.

A vehicle includes a head pipe 6h disposed at a front end of a vehicle body frame 6. A front fork 2 is steerably mounted to the head pipe 6h via a steering stem 5. The front fork 2 includes left and right fork pipes 3, 3 connected by a fork bridge 4 including a top bridge 4a and a bottom bridge 4b. The fork pipes 3, 3 support a front wheel 1 via an axle. The steering stem 5 is mounted across the top bridge 4a and the bottom bridge 4b so as to extend vertically. A handlebar 7 is fitted to the top bridge 4a.

A tubular damper 10 includes a damper case 11 and a damper rod 12 that slides inside the damper case 11. The damper case 11 has an end mounted to the head pipe 6h, while the damper rod 12 has an end mounted to the bottom bridge 4b.

In the arrangement disclosed in Japanese Patent Laid-open No. 2005-96735, the tubular damper 10 is mounted between the head pipe 6h and the bottom bridge 4b, disposed at a position between the top bridge 4a and the bottom bridge 4b on a side of the bottom bridge 4b. If, for example, a light unit, such as a headlamp or the like, is to be disposed on an upper portion of the front fork 2, the light unit is to be disposed at a space upward of the tubular damper 10. Disposing the light unit at this position results in a high optical axis of the light unit. As a result, a forward descent angle of the optical axis becomes greater when a predetermined position ahead of the vehicle is to be illuminated. This results in a smaller illumination range of a road surface in a longitudinal direction.

It is possible to dispose the light unit at a position forward of the tubular damper 10. This arrangement, however, requires that a space allowing the tubular damper 10 to rotate be secured. To allow for this space, the light unit is made to protrude forwardly, resulting in a complicated construction having only a forward upper portion of the vehicle protruding. It is then anticipated that appearance is impaired.

SUMMARY OF THE INVENTION

It is an object of the present invention to improve a vehicular steering damper mounting structure and to provide a steering damper that ensures a wide longitudinal illumination range of the road surface when a light unit is provided and that facilitates layout of parts and simplifies structure without degrading appearance.

To achieve the foregoing object, according to a first aspect of the present invention, there is provided a steering damper mounting structure of a vehicle. The vehicle includes a head pipe, a front fork, a fork bridge, and a steering damper. The head pipe forms part of a vehicle body. The front fork, which suspends a front wheel, is steerably disposed on the head pipe. The fork bridge includes a top bridge and a bottom bridge, each of which connects a left member and a right member of the front fork. Further, the steering damper is disposed on the fork bridge and the head pipe. The steering damper dampens a movement transmitted from a side of the front wheel to a handlebar. In this steering damper mounting structure, the steering damper is mounted to the head pipe and the top bridge and disposed on a side of the top bridge between the top bridge and the bottom bridge. Additionally, a light unit is disposed on a side of the bottom bridge between the top bridge and the bottom bridge.

The arrangements according to the first aspect of the present invention achieve the following effects. Specifically, disposing the light unit closer to the bottom bridge between the top bridge and the bottom bridge results in the light unit being disposed at an even lower position of an upper portion of the front fork. This leads to a smaller forward descent angle of an optical axis of the light unit when the light unit is brought into action to illuminate a predetermined position forward of the vehicle.

Further, the steering damper is mounted to the head pipe and the top bridge and is disposed on the side of the top bridge between the top bridge and the bottom bridge. This allows the light unit to be disposed near the bottom bridge between the top bridge and the bottom bridge without being affected by rotation of the steering damper. Moreover, the light unit does not overlap the steering damper in a forward direction of the vehicle. Accordingly, the light unit does not protrude forwardly and a structure is simplified at a forward upper portion of the vehicle, thus maintaining good appearance.

According to a second aspect of the present invention, the steering damper includes a main body having a cylinder, a piston movably inserted in the cylinder, and a rod mounted on the piston. Further, the main body has an end mounted on the head pipe and the rod has an end mounted on the top bridge. The main body includes an adjustment knob for use in adjusting a cross-sectional area of a path for oil packed in the cylinder. The adjustment knob is operable from an upward direction. The top bridge includes a protrusion that contacts the main body if an attempt is made to mount the main body on the top bridge or the rod on the head pipe, thereby preventing erroneous installation.

The arrangements according to the second aspect of the present invention achieve the following effects. Specifically, if the main body is mounted to the top bridge or the rod is mounted to the head pipe, then the protrusion comes in contact with the main body, defying further assembly steps. Erroneous installation can thereby be prevented.

Accordingly, the end of the main body is invariably mounted to the head pipe and the end of the rod is invariably mounted to the top bridge. The adjustment knob disposed on the main body for use in adjusting the cross-sectional area of the path for oil packed in the cylinder can be operable from the upward direction at all times.

According to a third aspect of the present invention, the end of the rod is mounted on the top bridge via the collar.

The arrangement according to the third aspect of the present invention achieves the following effect. Specifically, a direct force acts less easily from the rod on the top bridge.

According to a fourth aspect of the present invention, the vehicle includes the number plate marked with the competition identification number. The number plate is disposed upwardly of the light unit and forwardly of the steering damper.

The arrangement according to the fourth aspect of the present invention achieves the following effect. Specifically, the steering damper is covered with the number plate and protected from flying gravel or the like.

According to a fifth aspect of the present invention, the first portion of the steering damper attached to the head pipe and the second portion of the steering damper attached to the top bridge are each covered with the boot for minimizing entry of rainwater, dust, or the like.

The arrangement according to the fifth aspect of the present invention achieves the following effect. Specifically, the first portion of the steering damper attached to the head pipe and the second portion of the steering damper attached to the top bridge are pivotally moving portions which are less exposed to rainwater, dust, and the like.

According to a sixth aspect of the present invention, the boot includes an opening for draining water.

The arrangement according to the sixth aspect of the present invention achieves the following effect. Specifically, water entering the boot is drained through this opening for draining water.

In accordance with the first aspect of the present invention, the steering damper is mounted to the head pipe and the top bridge and is disposed on the side of the top bridge between the top bridge and the bottom bridge. Additionally, there is disposed the light unit on the side of the bottom bridge between the top bridge and the bottom bridge. Consequently, the light unit is disposed at a lower position in front of the front fork. The forward descent angle of the optical axis of the light unit can thus be kept small, helping make wider an illumination range in a longitudinal direction of the road surface.

Again, the steering damper is mounted to the head pipe and the top bridge and is disposed on the side of the top bridge between the top bridge and the bottom bridge. This additionally allows the light unit to be easily disposed near the bottom bridge between the top bridge and the bottom bridge without being affected by rotation of the steering damper. Moreover, the structure is simplified at the forward upper portion of the vehicle, thereby allowing the steering damper to be disposed without degrading appearance.

In accordance with the second aspect of the present invention, the steering damper includes the main body having the cylinder, the piston movably inserted in the cylinder, and the rod mounted on the piston. Further, the main body has an end mounted on the head pipe and the rod has an end mounted on the top bridge. The main body includes the adjustment knob for use in adjusting the cross-sectional area of the path for oil packed in the cylinder. The adjustment knob is operable from an upward direction. The top bridge includes the protrusion that contacts the main body if an attempt is made to mount the main body on the top bridge or the rod on the head pipe, thereby preventing erroneous installation. By letting the protrusion prevent erroneous installation of the steering damper, the steering damper can be disposed such that the adjustment knob included in the main body is faced upward at all times for easy operation.

In accordance with the third aspect of the present invention, the end of the rod is mounted on the top bridge via the collar. No direct force therefore acts from the rod on the top bridge. Wear in the top bridge can therefore be suppressed even if a material with a low hardness is used for the top bridge.

In accordance with the fourth aspect of the present invention, the vehicle includes the number plate marked with the competition identification number. The number plate is disposed upwardly of the light unit and forwardly of the steering damper. The steering damper is thus covered with the number plate and can be protected from flying gravel or the like.

In accordance with the fifth aspect of the present invention, the first portion of the steering damper attached to the head pipe and the second portion of the steering damper attached to the top bridge are each covered with the boot for minimizing entry of rainwater, dust, or the like. The first portion of the steering damper attached to the head pipe and the second portion of the steering damper attached to the top bridge, which are pivotally moved, are less exposed to rainwater, dust, and the like. A smooth pivotal movement of these portions can therefore be ensured for an extended period of time.

In accordance with the sixth aspect of the present invention, the boot includes the opening for draining water. Accordingly, water entering the boot is drained through this opening for draining water. No water can therefore be accumulated inside the boot.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a view for illustrating a pivotal movement of the steering damper according to the embodiment of the present invention;

FIGS. 9(a) through 9(d) are views showing schematically mounting positions on, and pivotally moved postures of, both ends of the steering damper.

DETAILED DESCRIPTION OF THE PREFERRED EMBODIMENTS

Figure 1:
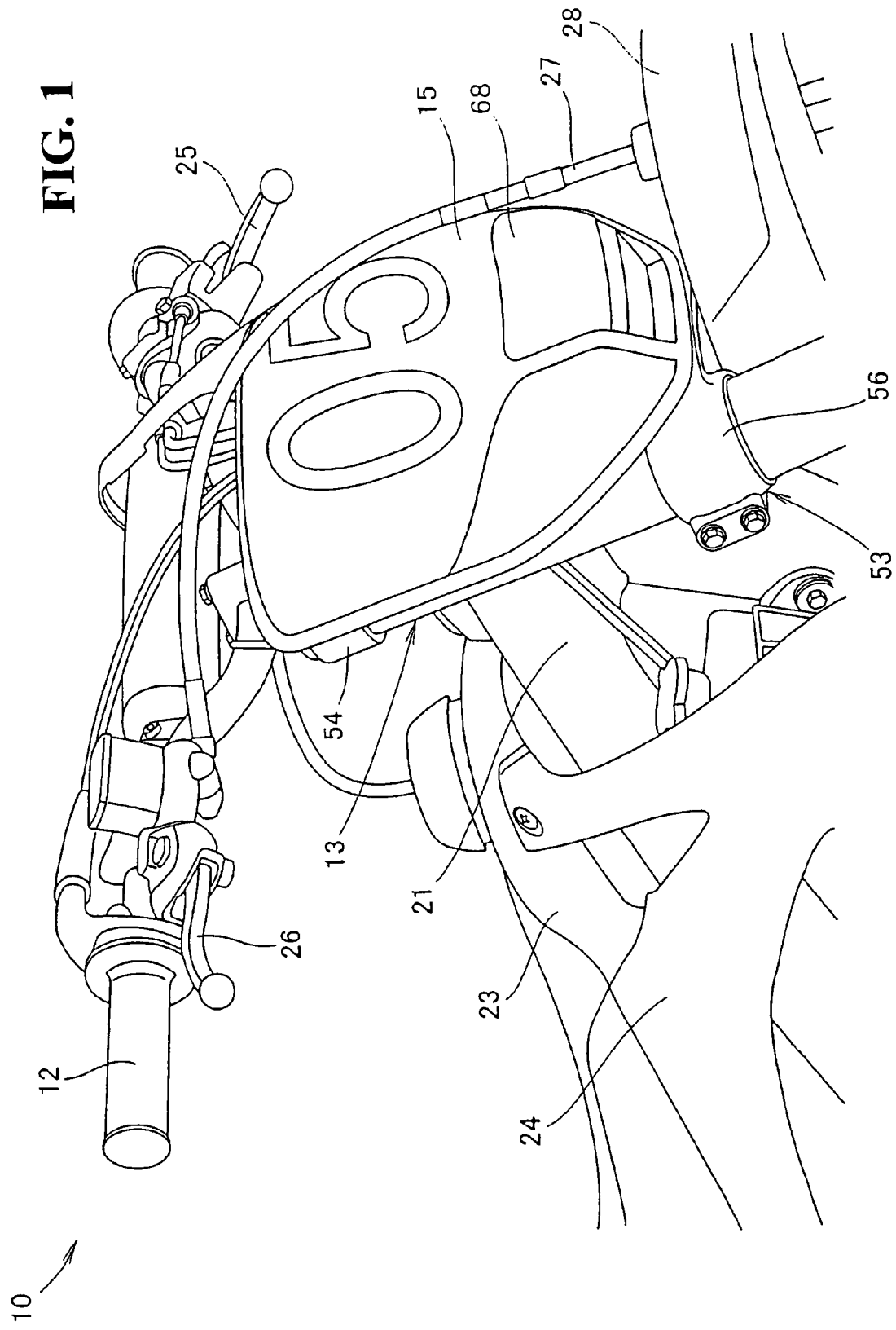
FIG. 1 is a perspective view showing a front portion of a vehicle having a steering damper according to an embodiment of the present invention.

The present invention will now be described in detail with reference to the accompanying drawings, wherein the same reference numerals will be used to identify the same or similar elements throughout the several views. The drawings should be viewed according to the orientation of the reference numerals.

FIG. 1 is a perspective view showing a front portion of a vehicle having a steering damper according to an embodiment of the present invention. A vehicle 10 is an off-road motorcycle. A handlebar 12 is fitted to an upper end of a front fork 13 that supports a front wheel at a lower end thereof. A steering damper (not shown) to be described in detail later is mounted on an upper portion of the front fork 13. A number plate 15 marked with a competition identification number is disposed so as to cover a forward area of the steering damper.

Referring to FIG. 1, reference numeral 21 represents a vehicle body frame serving as a framework for the vehicle 10. The front fork 13 is steerably mounted to a head pipe (not shown) disposed at a front end of the vehicle body frame 21.

In FIG. 1, reference numeral 23 represents a fuel tank mounted at an upper portion of the vehicle body frame 21. Reference numeral 24 represents a cowl that covers a front side portion of a vehicle body. Reference numerals 25, 26 represent a clutch lever and a front wheel brake lever, respectively, attached to the handlebar 12. Reference numeral 27 represents a brake hose that transmits an operating force applied to the front wheel brake lever 26 to a brake caliper disposed on a side of the front wheel as brake hydraulic pressure. Reference numeral 28 represents a front fender that covers an area upward of the front wheel.

Figure 2:
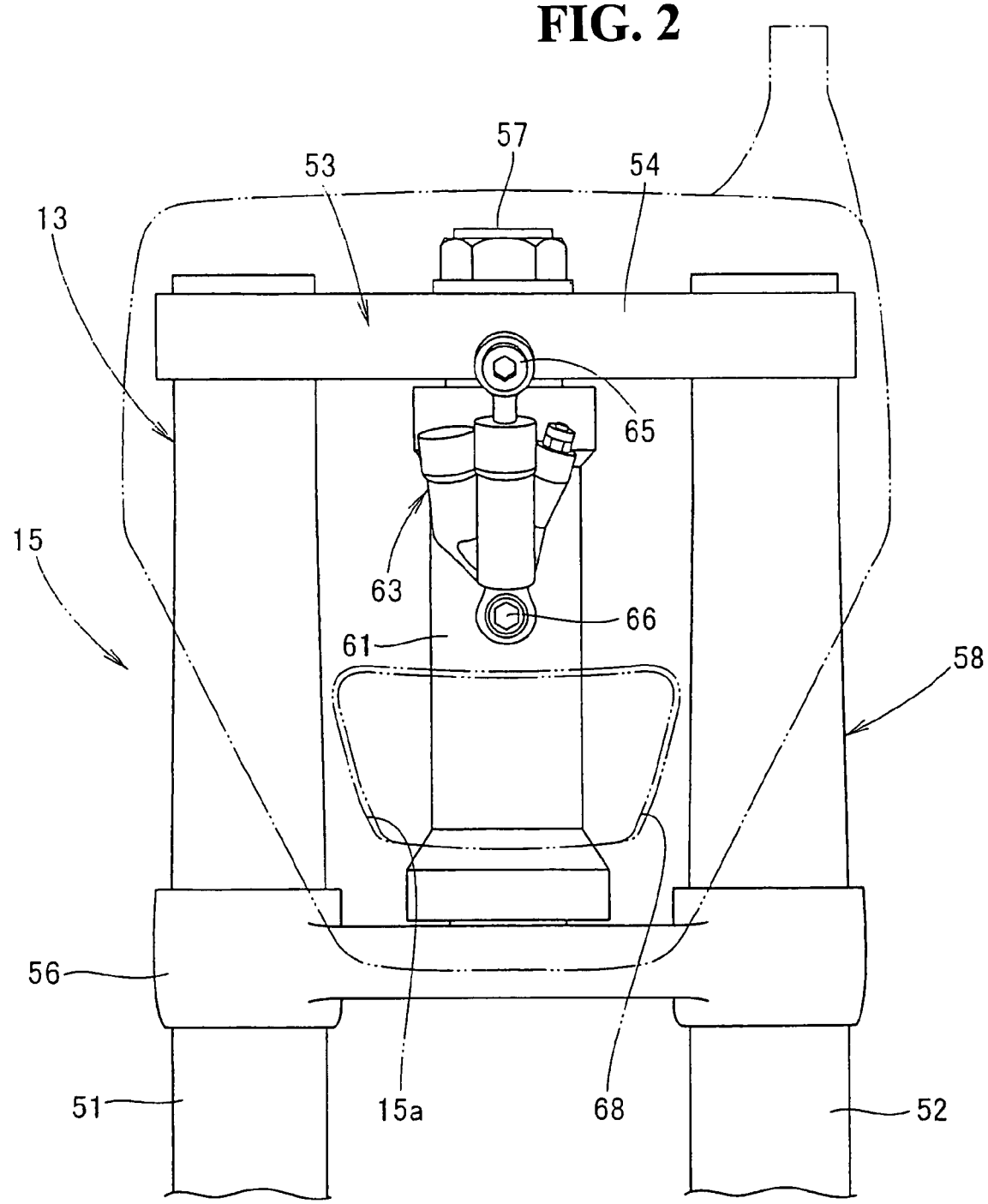
FIG. 2 is a view for illustrating the front portion of the vehicle according to the embodiment of the present invention.

FIG. 2 is a view for illustrating a front portion of the vehicle 10 according to the embodiment of the present invention. The front fork 13 includes a pair of left and right fork pipes 51, 52, a fork bridge 53, and a steering stem 57. The front wheel is mounted to lower ends of the fork pipes 51, 52 via an axle. The fork bridge 53 connects upper portions of the fork pipes 51, 52. The fork bridge 53 includes a top bridge 54 and a bottom bridge 56 formed of an aluminum alloy. The steering stem 57, which serves as a pivot, is extended across a central portion of each of the top bridge 54 and the bottom bridge 56.

The steering stem 57 is rotatably mounted on a head pipe 61 disposed at a front end of the vehicle body frame 21 (see FIG. 1).

The front fork 13, the handlebar 12 (see FIG. 1), and the head pipe 61 described above constitute a steering mechanism 58 for steering the front wheel.

A steering damper 63 is mounted with bolts 65, 66 between the head pipe 61 and the top bridge 54. The steering damper 63 serves as a shock absorber that lessens a steering directional force suddenly transmitted to the front fork 13 and the handlebar 12 from a road surface via the front wheel.

Figure 3:
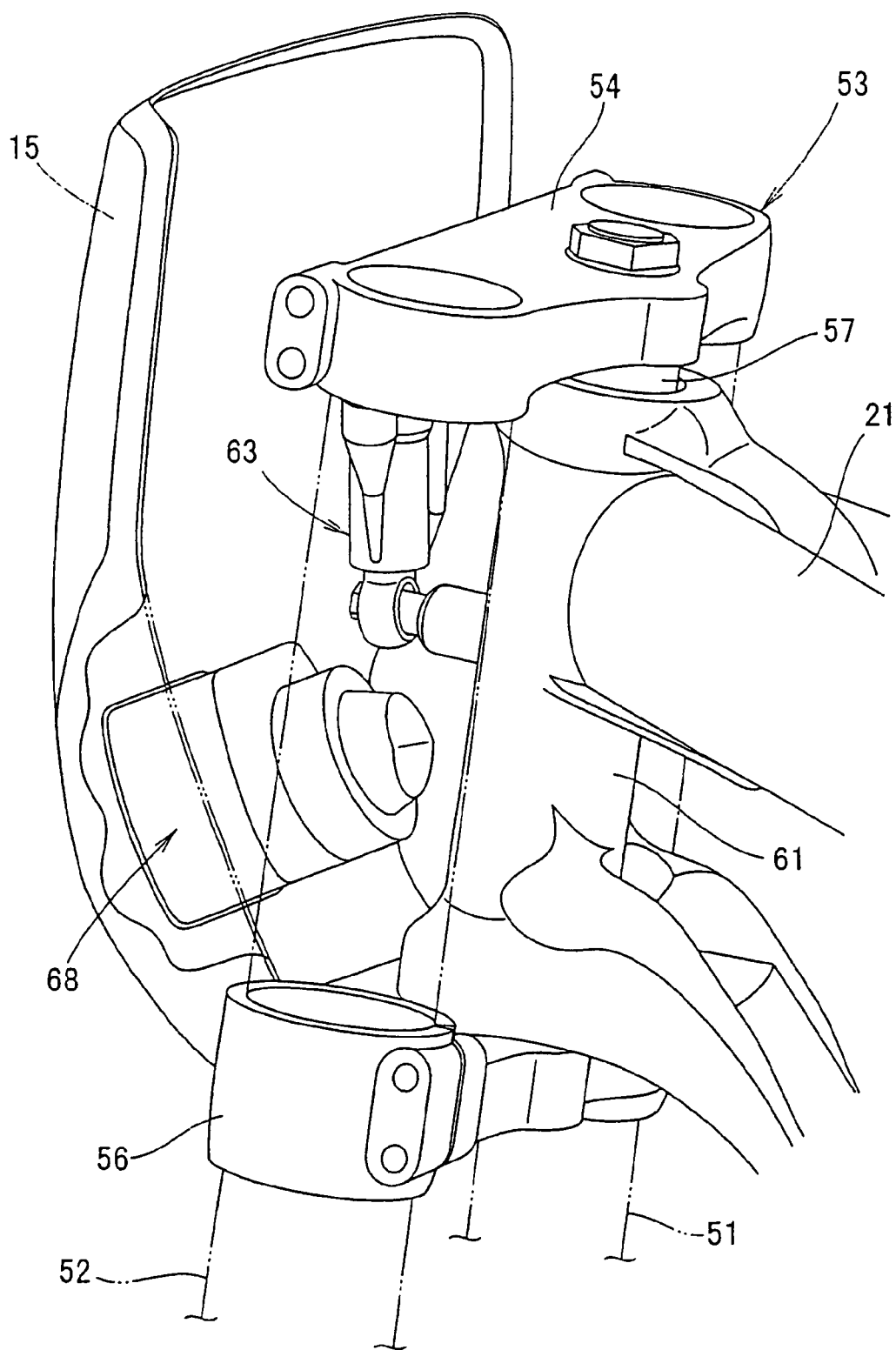
FIG. 3 is a perspective view showing the front portion of the vehicle according to the embodiment of the present invention.

FIG. 3 is a perspective view (an arrow FRONT in FIG. 3 indicates a forward direction of the vehicle; the same applies hereunder) showing the front portion of the vehicle 10 according to the embodiment of the present invention. FIG. 3 shows that a light unit 68 is disposed forwardly of the head pipe 61 and downwardly of the steering damper 63.

The light unit 68 is a lightweight competition lighting apparatus illuminating a road surface forward of the vehicle 10. The steering damper 63 can be protected from flying gravel or the like by being covered with the number plate 15 at a front thereof.

Figure 4:
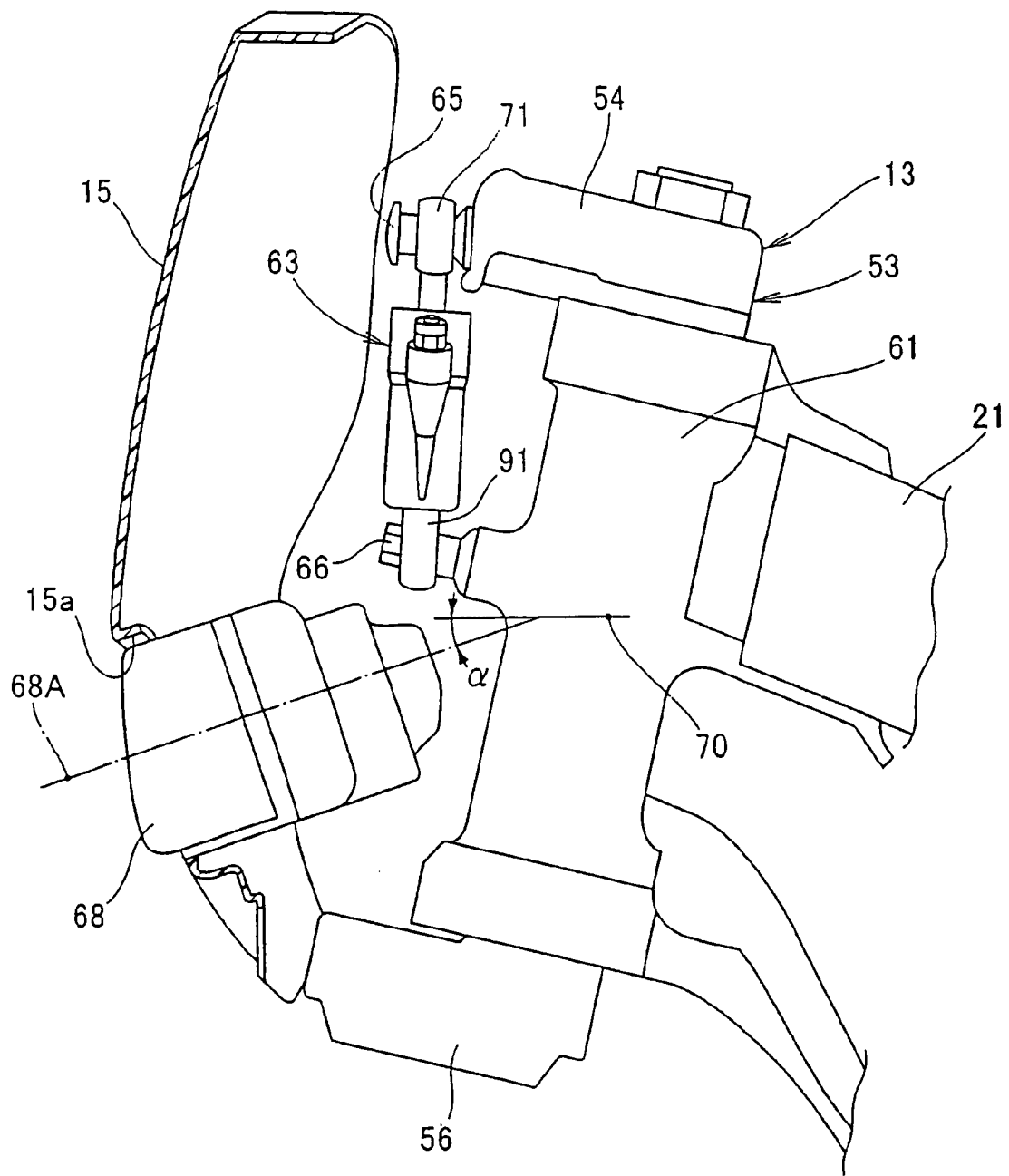
FIG. 4 is a side elevational view showing the front portion of the vehicle according to the embodiment of the present invention.

FIG. 4 is a side elevational view showing the front portion of the vehicle 10 according to the embodiment of the present invention. FIG. 4 shows the following arrangements, specifically: the steering damper 63 is pivotally movably mounted to a front portion of the head pipe 61 and a front portion of the top bridge 54; the steering damper 63 is disposed between the top bridge 54 and the bottom bridge 56 on the side of the top bridge 54; the light unit 68 is disposed downwardly of the steering damper 63 and between the top bridge 54 and the bottom bridge 56 on the side of the bottom bridge 56; and a portion forward of an area from the top bridge 54 to the bottom bridge 56 is covered with the number plate 15 (a cross section thereof is shown in FIG. 4).

The light unit 68 is mounted to the number plate 15 and is exposed forwardly of the vehicle 10 through a window 15a formed in the number plate 15. The light unit 68 has an optical axis (that coincides with an axis of an electric bulb) 68A inclined at an illumination angle α relative to a horizontal line 70.

Assume, for example, a case in which the light unit 68 is disposed further upwardly, for example, at a position of the steering damper 63. In this case, if the road surface located a predetermined distance forward of the vehicle 10 is illuminated with the light unit 68, the illumination angle involved becomes greater than the above-referenced illumination angle α. This results in a smaller longitudinal illumination range on the road surface. In accordance with the embodiment of the present invention, on the other hand, the light unit 68 is disposed at a lower level, so that the illumination angle α is even closer to the horizontal line 70. This allows the longitudinal illumination range on the road surface to be made greater.

The steering damper 63 has a proximal end fitted to the head pipe 61 and a distal end fitted to the top bridge 54. The proximal end of the steering damper 63 is disposed closer to a side of the head pipe 61 than the distal end thereof. Accordingly, the steering damper 63 is mounted substantially perpendicularly as compared with the head pipe 61 that is inclined relative to a perpendicular direction. Consequently, the proximal end of the steering damper 63 attached to the head pipe 61 protrudes forwardly only a small amount. This allows the number plate 15 to be disposed even closer to the side of the head pipe 61, contributing to a compactly built front portion of the vehicle 10.

Figure 5:
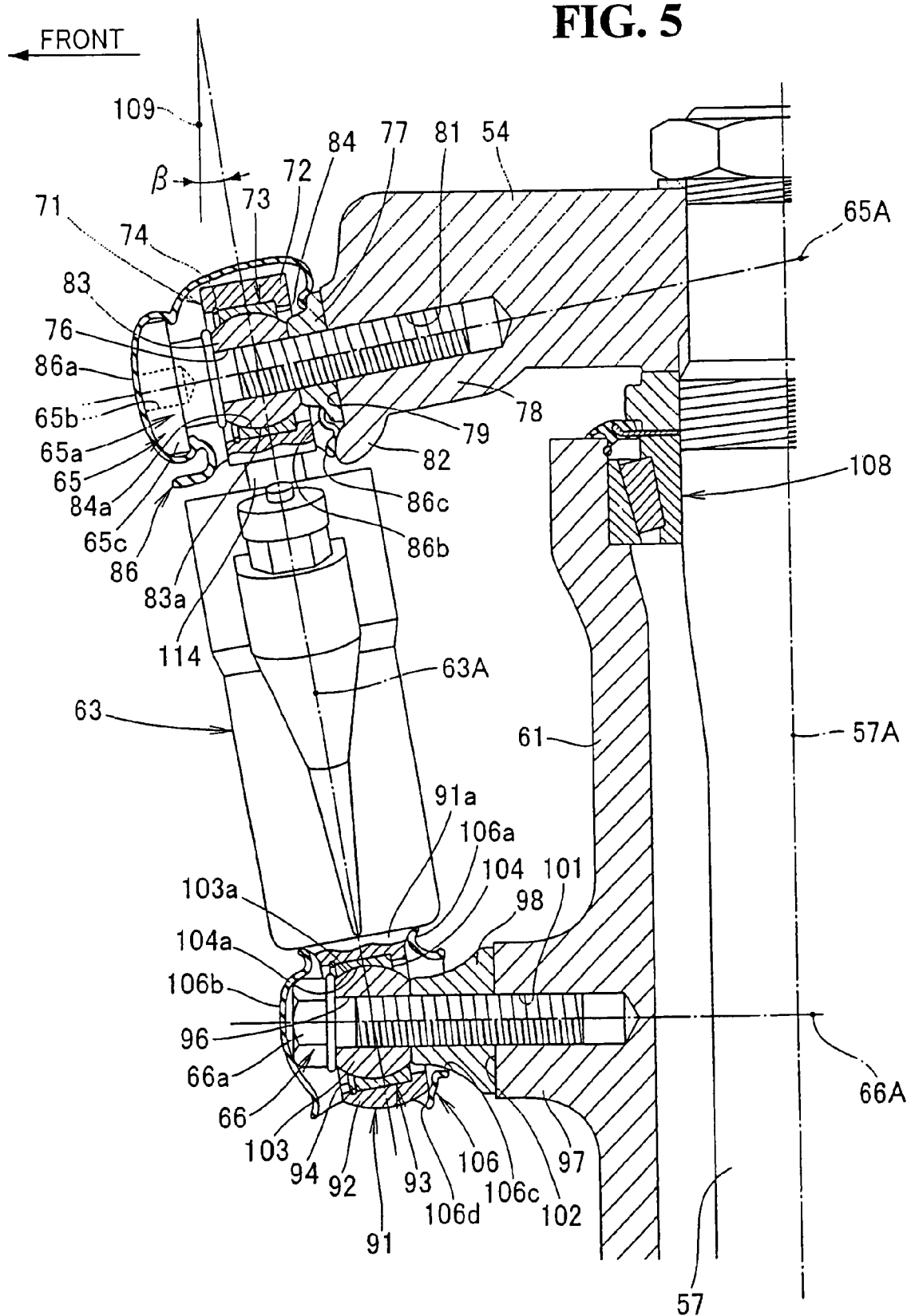
FIG. 5 is a cross-sectional view showing a steering damper mounting structure according to the embodiment of the present invention.

FIG. 5 is a cross-sectional view (partly side elevational view) showing a steering damper mounting structure according to the embodiment of the present invention. An upper mounting portion 71 for the steering damper 63 mounted on the top bridge 54 includes an upper annular portion 72, a spherical plain bearing 73, and a snap ring 74. The spherical plain bearing 73 is fitted into the upper annular portion 72. The snap ring 74 secures the spherical plain bearing 73 to the upper annular portion 72. The upper mounting portion 71 is mounted via a collar 77 to an upper mounting portion 78 formed in the top bridge 54 with the bolt 65 passed through a bolt insertion hole 76 formed in the spherical plain bearing 73. In FIG. 5, reference numeral 79 represents a mounting surface formed on an end of the upper mounting portion 78. Reference numeral 81 represents internal threads formed in the upper mounting portion 78, in which the bolt 65 is screwed. Reference numeral 82 represents a protrusion (to be described in detail later) formed on a lower portion on the end of the upper mounting portion 78, the protrusion 82 preventing erroneous installation of the steering damper 63.

The spherical plain bearing 73 includes an inner race 83 and an outer race 84. The inner race 83 has an outer surface 83a, on which part of a convex spherical surface is formed. The outer race 84 has an inner surface 84a, on which part of a concave spherical surface slidably fitted over the outer surface 83a of the inner race 83 is formed. The inner race 83 includes the bolt insertion hole 76, while the outer race 84 is fitted in the upper annular portion 72.

The upper mounting portion 71, a head 65a of the bolt 65, and part of the collar 77 are covered with an upper boot 86 formed of rubber. In FIG. 5, reference numeral 65b represents a hexagon socket formed in the head 65a. Reference numeral 65c represents a large-diameter portion formed in the head 65a.

The upper boot 86 includes a bolt fitting portion 86a, a collar fitting portion 86b, and an opening 86c. The bolt fitting portion 86a is fitted over the large-diameter portion 65c of the bolt 65. The collar fitting portion 86b is fitted to the collar 77. The opening 86c is for draining water. The upper boot 86 protects the upper mounting portion 71 from rainwater, dust, and the like. Rainwater entering the upper boot 86 is drained through the opening 86c.

A lower mounting portion 91 of the steering damper 63 is mounted to the head pipe 61. The lower mounting portion 91 includes a lower annular portion 92, a spherical plain bearing 93, and a snap ring 94. The spherical plain bearing 93 is fitted into the lower annular portion 92. The snap ring 94 secures the spherical plain bearing 93 to the lower annular portion 92. The lower mounting portion 91 is mounted via a collar 98 to a lower mounting portion 97 formed in the head pipe 61 with the bolt 66 passed through a bolt insertion hole 96 formed in the spherical plain bearing 93. In FIG. 5, reference numeral 101 represents internal threads formed in the lower mounting portion 97, in which the bolt 66 is screwed. Reference numeral 102 represents a mounting surface formed on the lower mounting portion 97.

The spherical plain bearing 93 includes an inner race 103 and an outer race 104. The inner race 103 has an outer surface 103a, on which part of a convex spherical surface is formed. The outer race 104 has an inner surface 104a, on which part of a concave spherical surface slidably fitted over the outer surface 103a of the inner race 103 is formed. The inner race 103 includes the bolt insertion hole 96, while the outer race 104 is fitted in the lower annular portion 92.

The lower mounting portion 91, a head 66a of the bolt 66, and part of the collar 98 are covered with a lower boot 106 formed of rubber. The lower boot 106 includes a base fitting portion 106a, a head abutment portion 106b, a side opening 106c, and a lower opening 106d. The base fitting portion 106a is fitted over a base portion 91a of the lower mounting portion 91. The head abutment portion 106b abuts on the head 66a of the bolt 66. The side opening 106c opens so as to circumvent the collar 98. The lower opening 106d disposed at a lower portion is for draining water. The lower boot 106 protects the lower mounting portion 91 from rainwater, dust, and the like. Rainwater entering the lower boot 106 is drained through the lower opening 106d.

Referring to FIG. 5, reference numeral 108 identifies a taper roller bearing disposed between the steering stem 57 and the head pipe 61.

When a handlebar steering angle is zero, an axis 63A of the steering damper 63 is inclined by an angle β relative to a straight line 109 that extends in parallel with an axis 57A of the steering stem 57 (and the head pipe 61) in a side view. Specifically, the axis 63A is inclined by the angle β relative to the axis 57A.

This represents the above-described arrangement, in which the lower mounting portion 91 of the steering damper 63 is disposed closer to a side of the axis 57A than the upper mounting portion 71.

As described heretofore, the axis 63A of the steering damper 63 is inclined relative to the axis 57A and, moreover, the mounting surface 79 on the side of the upper mounting portion 71 extends in parallel with the axis 63A in the side view when the handlebar steering angle is zero. This makes a swingable range of the spherical plain bearing 73 in the upper mounting portion 71 greater. It is to be noted that, in FIG. 5, reference numeral 65A represents an axis of the bolt 65 and reference numeral 66A represents an axis of the bolt 66.

Figure 6:
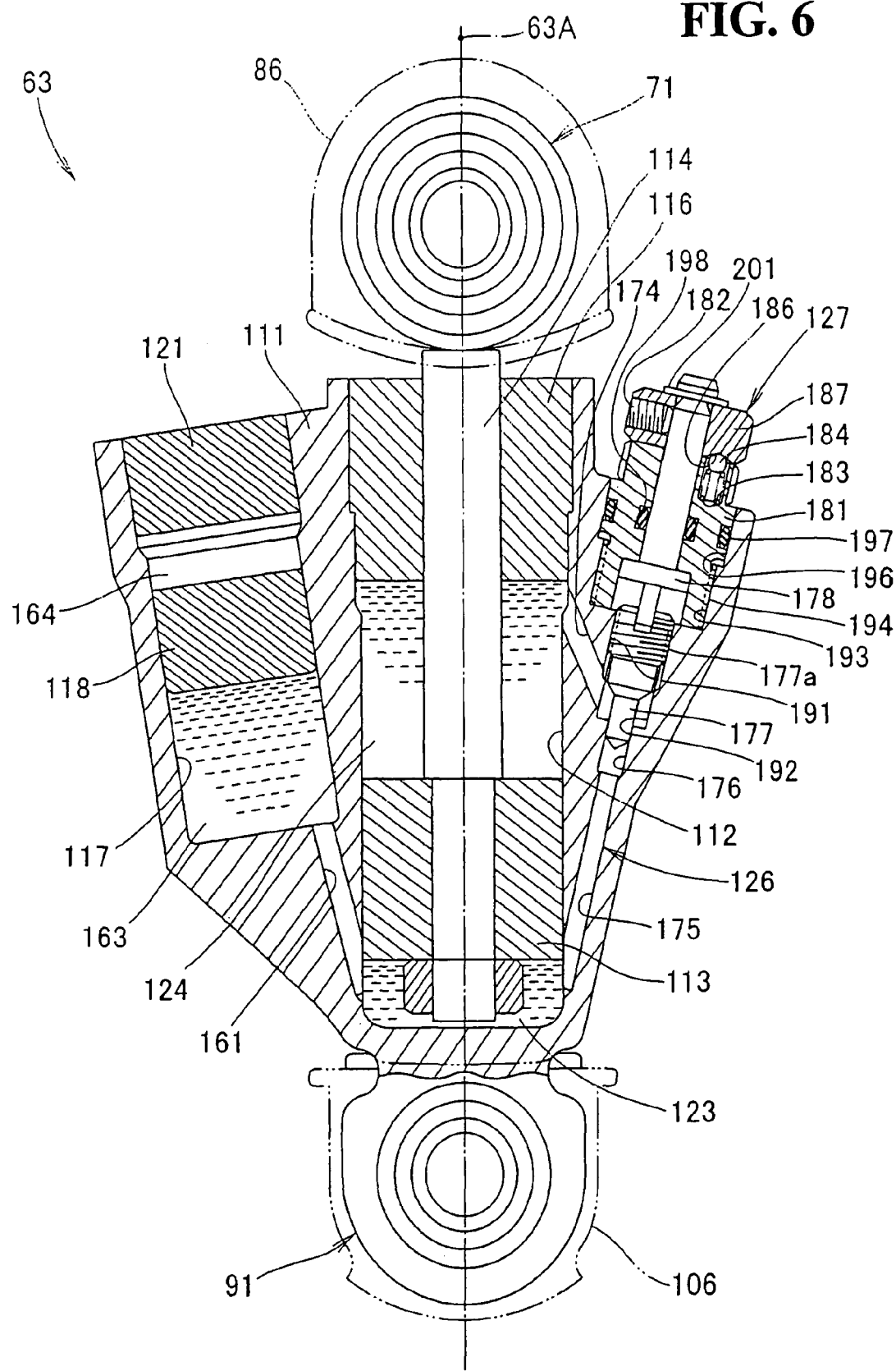
FIG. 6 is a cross-sectional view showing the steering damper according to the embodiment of the present invention.

FIG. 6 is a cross-sectional view showing the steering damper 63 according to the embodiment of the present invention. The steering damper 63 includes a body 111, a piston 113, a piston rod 114, the upper mounting portion 71, a first cylinder end hermetic sealing portion 116, a free piston 118, a second cylinder end hermetic sealing portion 121, and a flow rate adjustment mechanism 127. The body 111 includes a plurality of tubes. The piston 113 is movably inserted in a first cylinder hole 112 formed in the body 111. The piston rod 114 is attached to the piston 113. The upper mounting portion 71 is mounted to a leading end of the piston rod 114. The first cylinder end hermetic sealing portion 116 is fitted slidably in the piston rod 114 and closes an opening of the first cylinder hole 112. The free piston 118 is movably inserted in a second cylinder hole 117 formed in the body 111. The second cylinder end hermetic sealing portion 121 closes an opening of the second cylinder hole 117. The flow rate adjustment mechanism 127 varies a damping force of the steering damper 63 by adjusting a flow rate of a hydraulic fluid flowing through a communication path 126 that provides fluid communication between a first hydraulic chamber 123 and a second hydraulic chamber 124 formed on either side of the piston 113 in the first cylinder hole 112. The lower mounting portion 91 is integrally formed with a lower end of the body 111. In FIG. 6, reference numeral 161 represents a communication hole providing communication between the first cylinder hole 112 and the second cylinder hole 117. Reference numerals 163, 164 represent a first chamber and a second chamber, respectively, formed on either side of the free piston 118.

The above-referenced first hydraulic chamber 123, the second hydraulic chamber 124, and the first chamber 163 are filled with hydraulic fluid, while the second chamber 164 is filled with air.

The flow rate adjustment mechanism 127 includes a needle 177, an adjustment shaft 178, a shaft support member 181, and an adjustment knob 187. It is to be noted herein that the communication path 126 includes an upper communication hole 174 and a lower communication hole 175. To describe the flow rate adjustment mechanism 127 more specifically, the needle 177 advances into, or retracts from, a flow rate adjustment hole 176 formed at an upper end of the lower communication hole 175. The adjustment shaft 178 is connected to an end of the needle 177. The shaft support member 181 is mounted in the body 111 for rotatably supporting the adjustment shaft 178. The adjustment knob 187 is mounted to an end of the adjustment shaft 178 with a screw 182. The adjustment knob 187 can be stopped at every predetermined angle relative to the shaft support member 181 when a ball 184 pressed by a spring 183 fits into a specific one of a plurality of indentations 186, each being formed circumferentially at every predetermined angle.

Referring to FIG. 6, reference numeral 191 identifies internal threads formed in a lower longitudinal hole 192 in the body 111. The internal threads 191 are threadedly connected to external threads 177a formed on the needle 177. Reference numeral 193 identifies internal threads formed in an upper longitudinal hole 196 in the body 111. The internal threads 193 are threadedly connected to external threads 194 formed on the shaft support member 181. Reference numeral 197 identifies an O-ring fitted to an outer peripheral portion of the shaft support member 181. Reference numeral 198 identifies an O-ring mounted in an inner peripheral portion of the shaft support member 181. Reference numeral 201 identifies a retaining ring that prevents the adjustment knob 187 from coming off from the adjustment shaft 178.

Turning the adjustment knob 187 rotates the needle 177 via the adjustment shaft 178. Turning the adjustment knob 187 also causes the needle 177 to advance into, or retract from, the flow rate adjustment hole 176 through the internal threads 191 and the external threads 177a threadedly connected thereto.

The flow rate adjustment hole 176 is a female taper hole, while the needle 177 has a leading end that is a male taper to be engaged with the flow rate adjustment hole 176. As the leading end of the needle 177 advances into the flow rate adjustment hole 176, a cross-sectional area of the hydraulic fluid path becomes small, reducing the flow rate of the hydraulic fluid. When the leading end of the needle 177 retracts from the flow rate adjustment hole 176, the cross-sectional area of the hydraulic fluid path becomes large, increasing the flow rate of the hydraulic fluid.

Operation of the protrusion 82 for preventing erroneous installation of the steering damper 63 described heretofore will be described below.

Figure 7:
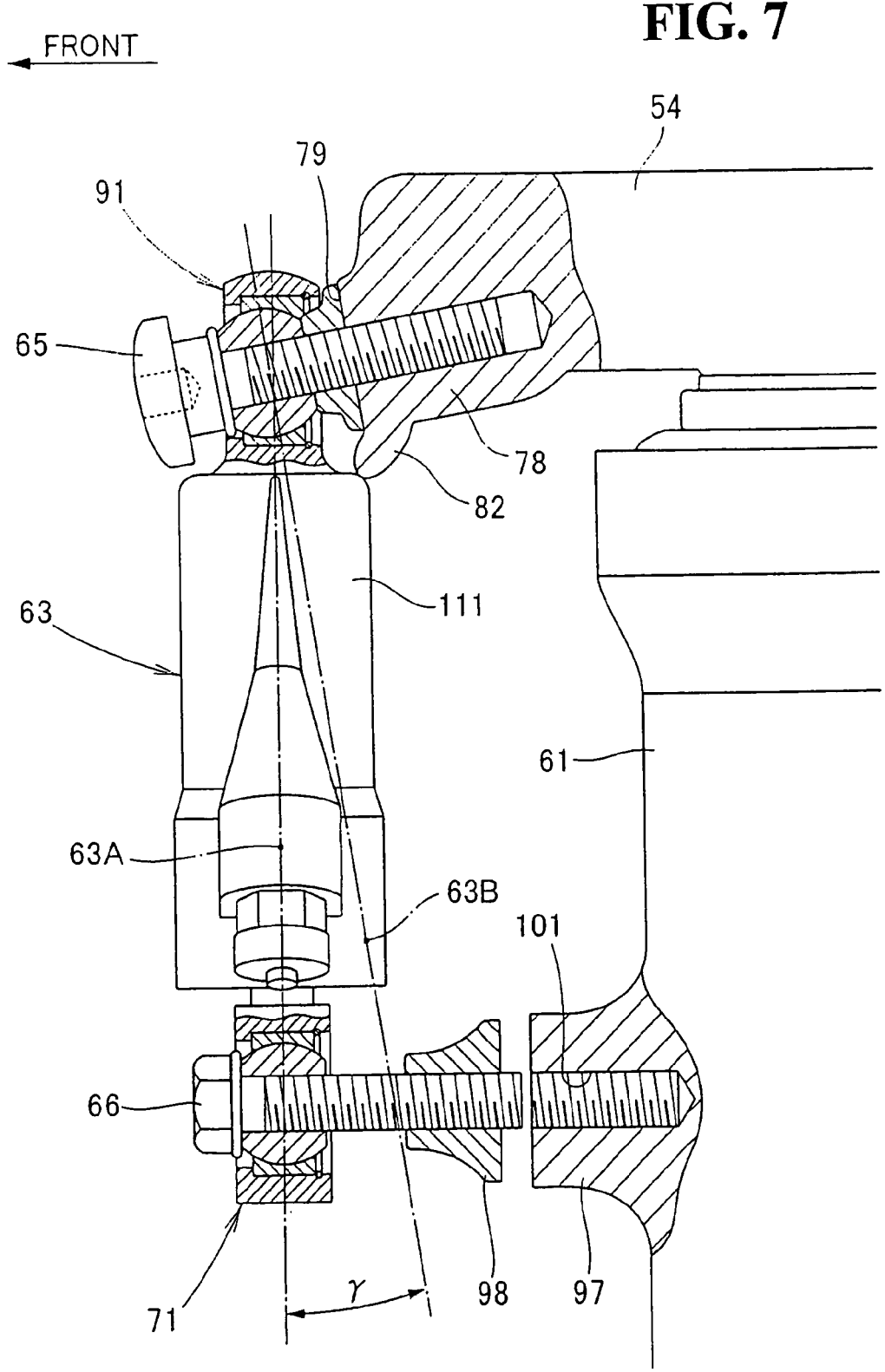
FIG. 7 is a view for illustrating the operation of a protrusion for preventing erroneous installation of the steering damper according to the embodiment of the present invention.

FIG. 7 is a view for illustrating the operation of the protrusion 82 for preventing erroneous installation of the steering damper 63 according to the embodiment of the present invention.

If, for example, the lower mounting portion 91 of the steering damper 63 is mistakenly mounted to the top bridge 54 with the bolt 65, the protrusion 82 contacts a portion of the body 111 of the steering damper 63 close to the lower mounting portion 91. This prevents the steering damper 63 from being inclined further toward the side of the head pipe 61. Specifically, the axis 63A of the steering damper 63 is inclined less by an angle γ relative to an axis 63B during correct installation.

Consequently, a further attempt will fail, in which the bolt 66 is passed through the upper mounting portion 71 of the steering damper 63 and the bolt 66 is screwed into the internal threads 101 in the head pipe 61. This is because the bolt 66 does not reach the internal threads 101, defying further assembly steps.

More specifically, if the lower mounting portion 91 of the steering damper 63 is mounted to the top bridge 54, or the upper mounting portion 71 of the steering damper 63 is mounted to the head pipe 61, the protrusion 82 contacts the body 111, so that the other mounting portion of the steering damper 63, that is, the upper mounting portion 71 or the lower mounting portion 91, cannot be mounted. As such, erroneous installation of the steering damper 63 can be prevented.

FIG. 8 is a view for illustrating a pivotal movement of the steering damper 63 according to the embodiment of the present invention. FIG. 8 is a bottom view showing the steering damper 63 and the top bridge 54 as viewed from a lower end side of the head pipe 61.

FIG. 8 shows that the top bridge 54 rotates from a position of zero steering angles as shown by an imaginary line to a position of a steering angle θ as shown by a solid line. FIG. 8 further shows that, as a result of the foregoing rotation of the top bridge 54, the steering damper 63 pivotally moves about the lower mounting portion 91, causing the upper mounting portion 71 to move arcuately as shown by an arrow.

FIGS. 9(a) through 9(d) are schematic views showing mounting positions on, and pivotally moved postures of, both ends of the steering damper 63. FIG. 9(a) is a side elevational view showing the embodiment of the present invention. FIG. 9(b) is a bottom view of FIG. 9(a). FIG. 9(c) is a side elevational view showing a comparative embodiment of the present invention. FIG. 9(d) is a bottom view of FIG. 9(c).

Referring to FIG. 9(a) showing the embodiment of the present invention, assume that a distance between the axis 57A and the lower mounting portion 91 (indicated by a black dot) of the steering damper 63 is R1, a distance between the axis 57A and the upper mounting portion 71 (indicated by a blank dot) of the steering damper 63 is R2 (R2>R1), and a distance between the upper mounting portion 71 and the lower mounting portion 91, that is, a distance between the mounting portions, is L1.

Referring to FIG. 9(b) showing the embodiment of the present invention, the steering damper 63 (the steering damper 63 is shown by a broad solid line; the same applies hereunder) gradually pivotally moves, through a steering action, about the lower mounting portion 91 as shown by the arrow, causing the upper mounting portion 71 to move through the steering angle θ.

Referring to FIG. 9(c) showing the comparative embodiment of the present invention, a steering damper 201 extends in parallel with an axis 57A. Further, a distance between the axis 57A and an upper mounting portion 202 (indicated by a blank dot) of the steering damper 201 equals a distance between the axis 57A and a lower mounting portion 203 (indicated by a blank dot) of the steering damper 201, each being referred to as R2. Further, assume that a distance between the upper mounting portion 202 and the lower mounting portion 203, that is, a distance between the mounting portions, is L2.

Referring to FIG. 9(d) showing the comparative embodiment of the present invention, the steering damper 201 gradually pivotally moves, through a steering action, about the lower mounting portion 203 as shown by the arrow, causing the upper mounting portion 202 to move through the steering angle θ.

Figure 10:
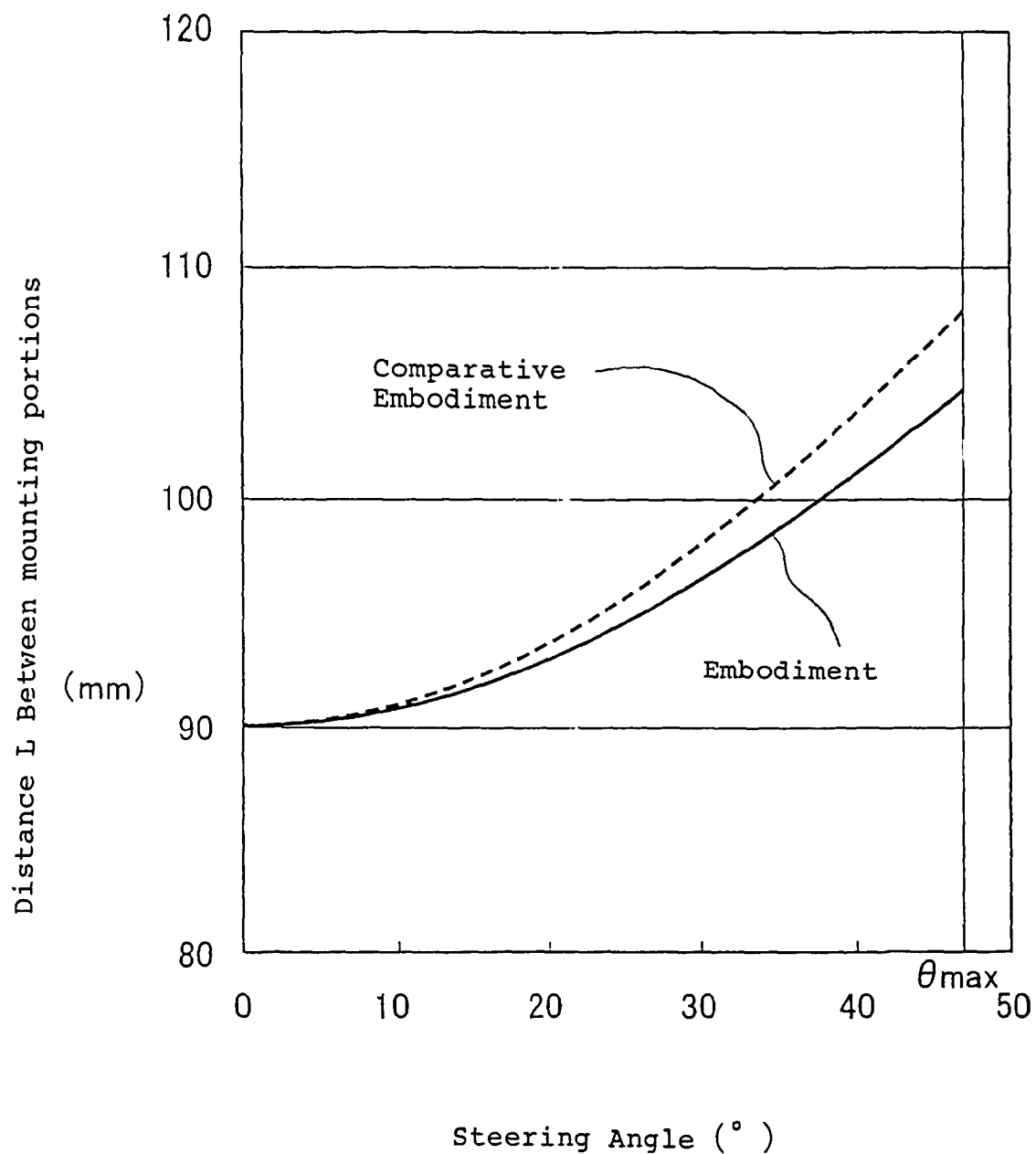
FIG. 10 is a graph showing changes in the distance between the mounting portions of the steering damper during the steering action according to the embodiments of the present invention.

FIG. 10 is a graph showing changes in the distance between the mounting portions of the steering damper during the steering action according to the embodiments of the present invention. On the graph shown in FIG. 10, the ordinate represents the distance L between the mounting portions of the steering damper. Specifically, the distance between the upper and lower mounting portions, and the abscissa represents the steering angle θ.

Referring to FIGS. 9(a) through 9(d), assume, for example, that the distance R1 is 60 mm, the distance R2 is 75 mm, the distance between the mounting portions L1 of the embodiment is 90 mm, the distance between the mounting portions L2 of the comparative embodiment is 90 mm, and the maximum steering angle θmax is 47°. Changes in the distance between the mounting portions L (specifically, L1 and L2) at the steering angle θ changing from 0 through θmax° become greater as the steering angle θ increases, as shown by the solid line for the embodiment and the broken line for the comparative embodiment. Further, the distance between the mounting portions L2 of the comparative embodiment remains greater at all times than the distance between the mounting portions L1 of the embodiment.

Though not shown, changes in the distance between the mounting portions L (specifically, L1 and L2) at the steering angle θ changing from 0 through −θmax° are the same as above.

In the graph shown in FIG. 10, the ordinate represents a stroke of the steering damper from an initial state if 90 mm is subtracted from the distance between the mounting portions L at each steering angle θ. The stroke of the embodiment remains smaller than that of the comparative embodiment at all times, which promotes reduction in size of the steering damper of the embodiment.

As described above with reference to FIGS. 1 through 4, according to the first aspect of the present invention, there is provided the steering damper mounting structure of the vehicle 10, which includes the head pipe 61, the front fork 13, the fork bridge 53, and the steering damper 63. The head pipe 61 forms part of a vehicle body. The front fork 13, which suspends the front wheel, is steerably disposed on the head pipe 61. The fork bridge 53 includes the top bridge 54 and the bottom bridge 56, each of which connects the left member and the right member of the front fork 13. Further, the steering damper 63 is disposed on the fork bridge 53 and the head pipe 61. The steering damper 63 dampens the movement transmitted from the side of the front wheel to the handlebar 12. In this steering damper mounting structure, the steering damper 63 is mounted to the head pipe 61 and the top bridge 54 and disposed on the side of the top bridge 54 between the top bridge 54 and the bottom bridge 56. Additionally, the light unit 68 is disposed on the side of the bottom bridge 56 between the top bridge 54 and the bottom bridge 56.

The foregoing arrangements result in the light unit 68 being disposed at a lower position in front of the front fork 13. This, in turn, leads to a smaller forward descent angle, specifically, the illumination angle α of the optical axis 68A of the light unit 68, thus widening the illumination range in the longitudinal direction of the road surface.

Further, the steering damper 63 is mounted to the head pipe 61 and the top bridge 54 and disposed on the side of the top bridge 54 between the top bridge 54 and the bottom bridge 56. This allows the light unit 68 to be easily disposed near the bottom bridge 56 between the top bridge 54 and the bottom bridge 56 without being affected by rotation of the steering damper 63. Moreover, the structure is simplified at the forward upper portion of the vehicle and the steering damper 63 can be disposed without degrading appearance.

As described above with reference to FIGS. 6 and 7, according to the second aspect of the present invention, the steering damper 63 includes the body 111 as a main body having the first cylinder hole 112 as a cylinder, the piston 113 movably inserted in the first cylinder hole 112, and the piston rod 114 as a rod mounted on the piston 113. Further, the body 111 has an end mounted on the head pipe 61 and the piston rod 114 has an end mounted on the top bridge 54. The body 111 includes the adjustment knob 187 for use in adjusting the cross-sectional area of the path for oil packed in the first cylinder hole 112. The adjustment knob 187 is operable from an upward direction. The top bridge 54 includes the protrusion 82 that contacts the body 111 if an attempt is made to mount the body 111 on the top bridge 54 or the piston rod 114 on the head pipe 61, thereby preventing erroneous installation.

These arrangements let the protrusion 82 prevent erroneous installation of the steering damper 63. The steering damper 63 can thereby be disposed such that the adjustment knob 187 included in the body 111 is faced upwardly at all times for easy operation.

Referring to FIG. 5, according to the third aspect of the present invention, the end of the piston rod 114 is mounted on the top bridge 54 via the collar 77. This arrangement results in no direct force acting from the piston rod 114 on the top bridge 54. Wear in the top bridge 54 can thereby be suppressed even if a material with a low hardness is used for the top bridge 54.

Referring to FIG. 4, according to the fourth aspect of the present invention, the vehicle 10 includes the number plate 15 marked with the competition identification number. The number plate 15 is disposed upwardly of the light unit 68 and forwardly of the steering damper 63. The steering damper 63 is thus covered, at a forward area thereof, with the number plate 15 and can be protected from flying gravel or the like.

Referring to FIG. 5, according to the fifth aspect of the present invention, the first portion (lower mounting portion 91) of the steering damper 63 attached to the head pipe 61 and the second portion (upper mounting portion 71) of the steering damper 63 attached to the top bridge 54 are covered with the lower boot 106 and the upper boot 86, respectively, for minimizing entry of rainwater, dust, or the like.

The upper boot 86 and the lower boot 106 help make the upper mounting portion 71 and the lower mounting portion 91, which are pivotally moved, less exposed to rainwater, dust, and the like. A smooth pivotal movement of the upper mounting portion 71 and the lower mounting portion 91 can therefore be maintained for an extended period of time.

According to the sixth aspect of the present invention, the upper boot 86 and the lower boot 106 include the opening 86c and the lower opening 106d, respectively, as an opening for draining water. Water entering the upper boot 86 and the lower boot 106 is therefore drained through the opening 86c and the lower opening 106d. No water can therefore be accumulated inside the upper boot 86 and the lower boot 106.

The steering damper of the vehicle according to the present invention is ideally applicable to a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper mounting structure of a vehicle, comprising:
   a head pipe forming part of a vehicle body;
   a front fork steerably disposed on the head pipe, the front fork for suspending a front wheel;
   a fork bridge including a top bridge and a bottom bridge connecting a left member and a right member of the front fork;
   a steering damper disposed on the fork bridge and the head pipe, the steering damper for dampening a movement transmitted from a side of the front wheel to a handlebar, the steering damper including a main body, a lower mounting portion extending below the main body and mounted to the head pipe, and an upper mounting portion extending above the main body and mounted to the top bridge, the steering damper being disposed on a side of the top bridge between the top bridge and the bottom bridge, wherein the top bridge includes a protrusion that contacts the main body when an attempt is made to mount the lower mounting portion to the top bridge or mount the upper mounting portion to the head pipe, thereby preventing erroneous installation; and
   a light unit disposed on a side of the bottom bridge between the top bridge and the bottom bridge.

2. The steering damper mounting structure according to claim 1, wherein the vehicle includes a number plate marked with a competition identification number, the number plate being disposed upwardly of the light unit and forwardly of the steering damper.

3. The steering damper mounting structure according to claim 1, wherein the lower mounting portion of the steering damper mounted to the head pipe by a first nut and the upper mounting portion of the steering damper mounted to the top bridge by a second nut are each covered with a boot for minimizing entry of rainwater or dust.

4. The steering damper mounting structure according to claim 3, wherein the boot includes an opening for draining water.

5. The steering damper mounting structure according to claim 1, wherein the top bridge has a collar and the steering damper is mounted to the collar of the top bridge.

6. A steering damper mounting structure of a vehicle, comprising:
a head pipe forming part of a vehicle body;
a front fork steerably disposed on the head pipe, the front fork for suspending a front wheel;
a fork bridge including a top bridge and a bottom bridge connecting a left member and a right member of the front fork;
a steering damper disposed on the fork bridge and the head pipe, the steering damper for dampening a movement transmitted from a side of the front wheel to a handlebar, the steering damper being mounted to the head pipe and the top bridge and being disposed on a side of the top bridge between the top bridge and the bottom bridge; and
a light unit disposed on a side of the bottom bridge between the top bridge and the bottom bridge,
wherein the steering damper includes a main body having a cylinder, a piston movably inserted in the cylinder, and a rod disposed on the piston, the main body has an end disposed on the head pipe and the rod has an end disposed on the top bridge, the main body includes an adjustment knob for use in adjusting a cross-sectional area of a path for oil packed in the cylinder, the adjustment knob being operable from an upward direction, and the top bridge includes a protrusion that contacts the main body if an attempt is made to mount the main body on the top bridge or the rod on the head pipe, thereby preventing erroneous installation.

7. The steering damper mounting structure according to claim 6, wherein the end of the rod is mounted on the top bridge via a collar.

8. The steering damper mounting structure according to claim 6, wherein the vehicle includes a number plate marked with a competition identification number, the number plate being disposed upwardly of the light unit and forwardly of the steering damper.

9. The steering damper mounting structure according to claim 2, wherein a first portion of the steering damper attached to the head pipe and a second portion of the steering damper attached to the top bridge are each covered with a boot for minimizing entry of rainwater, dust, or the like.

10. The steering damper mounting structure according to claim 9, wherein the boot includes an opening for draining water.

11. A steering damper mounting structure for a vehicle, the vehicle including a head pipe, a front fork, a fork bridge including a top bridge and a bottom bridge connecting a left member and a right member of the front fork, said steering damping mounting structure comprising:
a steering damper including a main body, an upper mounting portion extending above the main body and mounted to the top bridge, and a lower mounting portion extending below the main body and mounted to the head pipe, the steering damper being between the top bridge and the bottom bridge, wherein the top bridge includes a protrusion that contacts the main body when an attempt is made to mount the lower mounting portion to the top bridge or mount the upper mounting portion to the head pipe, thereby preventing erroneous installation; and
a light unit disposed on a side of the bottom bridge between the top bridge and the bottom bridge.

12. The steering damper mounting structure according to claim 11, wherein the vehicle includes a number plate marked with a competition identification number, the number plate being disposed upwardly of the light unit and forwardly of the steering damper.

13. The steering damper mounting structure according to claim 11, wherein the lower mounting portion of the steering damper mounted to the head pipe by a first nut and the upper mounting portion of the steering damper mounted to the top bridge by a second nut are each covered with a boot for minimizing entry of rainwater or dust.

14. The steering damper mounting structure according to claim 13, wherein the boot includes an opening for draining water.

15. The steering damper mounting structure according to claim 11, wherein the top bridge has a collar and the steering damper is mounted to the collar of the top bridge.

16. A steering damper mounting structure for a vehicle, the vehicle including a head pipe, a front fork, a fork bridge including a top bridge and a bottom bridge connecting a left member and a right member of the front fork, said steering damping mounting structure comprising:
a steering damper mounted to the fork bridge and the head pipe, the steering damper being between the top bridge and the bottom bridge; and
a light unit disposed on a side of the bottom bridge between the top bridge and the bottom bridge,
wherein the steering damper includes a main body having a cylinder, a piston movably inserted in the cylinder, and a rod disposed on the piston, the main body has an end disposed on the head pipe and the rod has an end disposed on the top bridge, the main body includes an adjustment knob for use in adjusting a cross-sectional area of a path for oil packed in the cylinder, the adjustment knob being operable from an upward direction, and the top bridge includes a protrusion that contacts the main body if an attempt is made to mount the main body on the top bridge or the rod on the head pipe, thereby preventing erroneous installation.

17. The steering damper mounting structure according to claim 16, wherein the end of the rod is mounted on the top bridge via a collar.

18. The steering damper mounting structure according to claim 16, wherein the vehicle includes a number plate marked with a competition identification number, the number plate being disposed upwardly of the light unit and forwardly of the steering damper.

19. The steering damper mounting structure according to claim 16, wherein a first portion of the steering damper attached to the head pipe and a second portion of the steering damper attached to the top bridge are each covered with a boot for minimizing entry of rainwater, dust, or the like.

20. The steering damper mounting structure according to claim 19, wherein the boot includes an opening for draining water.

* * * * *